Nov. 10, 1964  C. B. ADELMANN  3,156,115
RATE OF FLOW INDICATING DEVICE
Filed May 10, 1961  5 Sheets-Sheet 1

INVENTOR.
Charles B. Adelmann
BY
Attorneys

Nov. 10, 1964   C. B. ADELMANN   3,156,115
RATE OF FLOW INDICATING DEVICE
Filed May 10, 1961   5 Sheets-Sheet 3

INVENTOR.
Charles B. Adelmann
BY
Attorneys

INVENTOR.
Charles B. Adelmann
BY
Attorneys

INVENTOR.
Charles B. Adelmann
BY
Attorneys

United States Patent Office  3,156,115
Patented Nov. 10, 1964

3,156,115
RATE OF FLOW INDICATING DEVICE
Charles B. Adelmann, 9 Ocho Rios Place, Danville, Calif.
Filed May 10, 1961, Ser. No. 109,129
7 Claims. (Cl. 73—198)

This invention relates to a rate of flow indicating apparatus and more particularly to a rate of flow indicating apparatus which is particularly adapted for use with conventional meters.

At the present time, there is a need to know more about domestic rate of use habits with respect to water consumption. With apparatus presently available, it is extremely difficult to obtain information from such apparatus and relate it to a rate of flow study. There is also a need for apparatus which will determine when meters of certain types as, for example, water meters, become so inaccurate that they should be replaced. As is well known to those skilled in the art, water meters and other types of meters after long periods of use become less accurate because of wear of the moving parts. Rate of flow indicating apparatus to be satisfactory must not be directly connected to the meter so that it will not affect the accuracy of the meter during the time the measurements are being made or during the time the meter is being checked for accuracy. There is, therefore, a need for a new and improved apparatus for giving rate of flow information.

In general, it is an object of the present invention to provide a rate of flow indicating apparatus which is particularly adapted for measuring the rate of flow of fluids.

Another object of the invention is to provide rate of flow indicating apparatus which can be utilized for determining the maximum rate of use.

Another object of the invention is to provide rate of flow indicating apparatus which can be utilized for checking the accuracy of usage meters and particularly the accuracy at low rates.

Another object of the invention is to provide rate of flow indicating apparatus of the above character which can be utilized with mechanically actuated or magnetically actuated positive displacement meters.

Another object of the invention is to provide rate of flow indicating apparatus of the above character which does not require a direct mechanical connection to the moving parts of the meter.

Another object of the invention is to provide rate of flow indicating apparatus of the above character which can be utilized with nutating disc type meters, oscillating piston type meters and turbine type meters.

Another object of the invention is to provide rate of flow indicating apparatus of the above character which can be utilized for determining whether or not the service is properly metered as to the size of meter installed.

Another object of the invention is to provide rate of flow indicating apparatus of the above character which can be utilized as a demand meter.

Another object of the invention is to provide rate of flow indicating apparatus of the above character which can be utilized for making domestic or industrial rate of use surveys.

Another object of the invention is to provide rate of flow indicating apparatus of the above character which is relatively simple in construction and which is relatively economical to produce.

Another object of the invention is to provide rate of flow indicating apparatus which can be incorporated in conventional meters without modification of the meters.

Another object of the invention is to provide rate of flow indicating apparatus of the above character which can be readily inserted into and removed from conventional meters.

Additional objects and features of the invention will appear from the following description in which the preferred embodiments are set forth in detail in conjunction with the accompanying drawings.

Referring to the drawings.

In general, my rate of flow indicating apparatus is of a type which is adapted for use with various types of meters such as water meters for indicating rate of flow. The apparatus is of a type which may be incorporated in existing meters or in meters at the time of their manufacture. Such meters, as is well known to those skilled in the art are provided with rotating shaft. My apparatus consists of a disc which is adapted to be mounted on a shaft and to be rotated thereby. Sensing means which is out of engagement with the disc is provided for measuring the rate of rotation of the disc. Means is connected to the sensing means for indicating the rate of rotation of the shaft. The sensing means in one embodiment takes the form of photosensitive means, whereas in another embodiment it takes the form of magnetic means.

Figure 1:
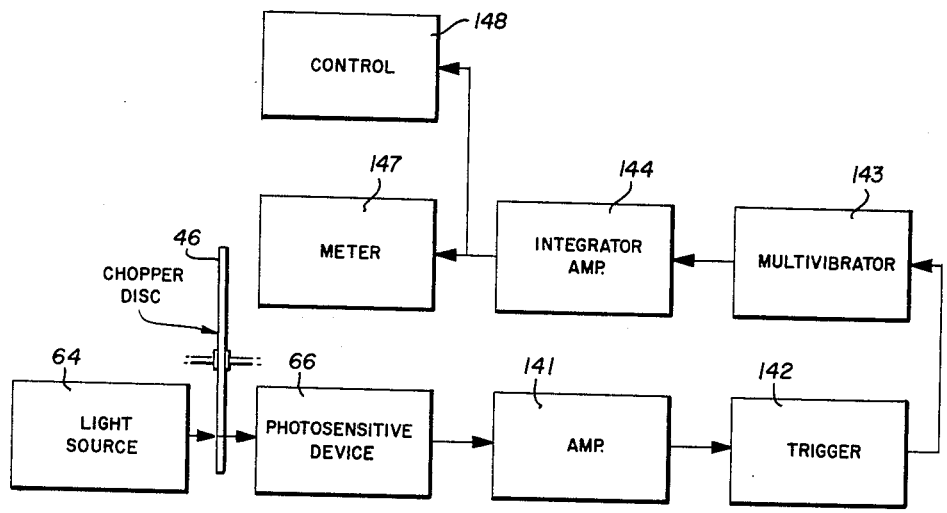
FIGURE 1 is a block diagram of my rate of flow indicating apparatus utilizing photosensitive sensing means.
Figure 2:
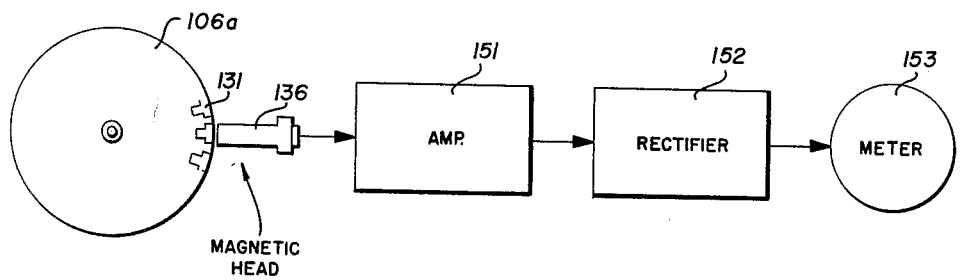
FIGURE 2 is a block diagram of my rate of flow indicating apparatus utilizing magnetic sensing means.

In FIGURES 1 and 2, I have shown a block diagram of two embodiments of my apparatus. In FIGURE 1, the photosensitive sensing means is utilized whereas in FIGURE 2 the magnetic sensing means is utilized.

Figure 4:
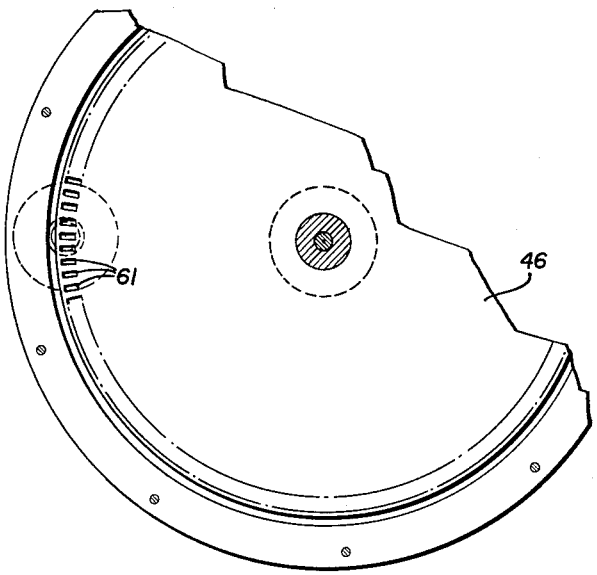
FIGURE 4 is a cross-sectional view taken along the line 4—4 of FIGURE 3.
Figure 3:
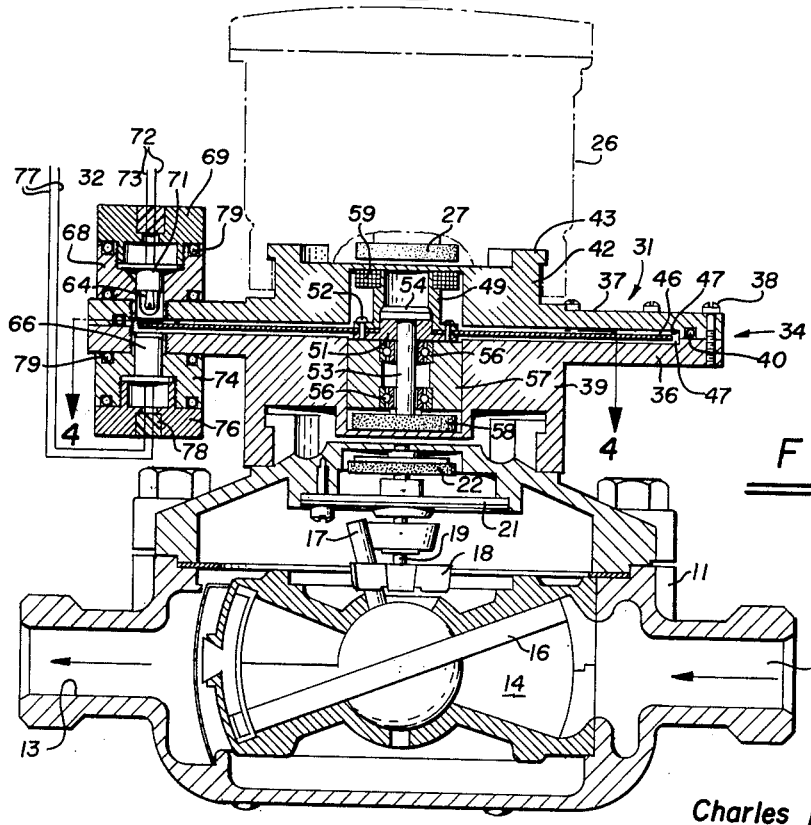
FIGURE 3 is a cross-sectional view of a magnetic drive disc type water meter incorporating a portion of my apparatus utilizing the photosensitive sensing means.

To enable a person to more fully understand the block diagrams shown in FIGURES 1 and 2, it is preferable to first describe the photosensitive sensing means and the magnetic sensing means, and the manner in which they are adapted to be mounted in a conventional meter. In FIGURES 3 and 4, I have shown a portion of my appartus which is adpted to be mounted in a magnetic drive disc type meter of a conventional type such as one manufactured by the Badger Meter Manufacturing Company of Milwaukee, Wisconsin. Such a meter, as shown in the drawing, consists of a two-part housing 11 which is provided with an inlet passage 12 and an outlet passage 13. A chamber 14 is provided within the housing 11 in which a disc 16 is mounted for nutrational movement. The disc 16 is provided with a shaft 17 which engages a pawl 18 mounted on the lower end of the shaft 19. The shaft 19 is rotatably mounted in a plate 21 secured within the housing 11 and drives a magnet 22.

A removable register of sealed construction is normally mounted by a bayonet lock attachment to the housing 11. The register 26, as is well known to those skilled in the art, is provided with a driven magnet 27 which drives a gear train and register (not shown). The disc assembly 31 and the sensing assembly 32, as shown particularly in FIGURE 3, are adapted to be mounted between the housing 11 and the removable register 26 to perform functions as hereinafter described.

The disc assembly consists of a housing or casing 34 which is comprised of a lower section 36 and an upper section 37. The lower and upper sections 36 and 37 are fastened together by suitable means such as cap screws 38 and are sealed by an O-ring 40. As is shown in the drawing, the lower section 36 is provided with a cylindrical extension 39 which is provided with a female recess 41 to accommodate the male extensions provided on the housing 11 to form a bayonet lock attachment in the same manner in which the register 26 would form a bayonet lock attachment with the housing 11. Similarly, the upper section 37 is provided with a cylindrical extension 42 which is adapted to seat in the female recess 43 provided in the register casing to form a similar bayonet lock attachment. Thus, it can be seen that the lower section 36 is secured to the housing 11, whereas the register 26 is secured to the upper section 37.

A circular member in the form of a disc 46 is rotatably mounted between the lower and upper sections 36 and 37 in annular recess 47 provided in the sections 36 and 37. The disc 46 lies in a plane which is generally parallel to the plane of the lower and upper sections 36 and 37. The disc 46 is mounted between a pair of hubs 49 and 51 and is secured therebetween by suitable means such as screws 52. The hubs 49 and 51 are secured to a downwardly extending shaft 53 which is provided with a cap 54 which seats upon the hub 51. The shaft 53 extends downwardly through a pair of ball bearing assemblies 56 which are mounted in a fixed bushing 57 mounted in the cylindrical portion 39 of the lower section 36. It will be noted that the hub 51 rides upon the bushing 57 so that the bushing 57 forms a thrust bearing for the disc assembly. A magnet 58 of a type similar to the magnets 22 and 27 is mounted on the lower end of the shaft 53. It will be noted that the magnet 58 is mounted in such a manner that it is enclosed within the cylindrical extension 39 of the lower section 36. Another magnet 59 of a type similar to the magnet 58 is mounted on the upper extermity of the hub 49. It is also enclosed within the cylindrical extension 42 of the upper section 37.

As hereinafter described, the arrangement is such that the magnet 22 drags the magnet 58. The magnet 58 drives the shaft 53 which, in turn, drives the disc 46 and the hub 49. The hub 49 drives the magnet 52 which drives the magnet 27 within the register 26.

The disc 46 is formed with a plurality of openings on its outer margin which are formed as rectangular slots 61 as shown particularly in FIGURE 4. The slots 61 are evenly spaced on the disc with identical radii. Any suitable number of slots can be utilized. For example, in one embodiment of my invention, I have found that it is desirable to use 120 slots on a disc with the slots having a width of 0.050 inch, length of 0.250 inch on a a disc approximately 4 inches in diameter. The disc 46 with its slots 61 serves as a chopping disc as hereinafter described. As shown in the drawings, a photosensitive sensing assembly 32 is mounted adjacent the disc assembly 31. The assembly consists of a light source in the form of a lamp 64 which is mounted on one side of the disc opposite the slots 61 and a photosensitive element 66 mounted on the other side of the disc 46 opposite the slots 61. The lamp 64 can be of any suitable type such as GE type No. 1775 or type No. 327. The photosensitive element 66 can also be of any suitable type such as the General Transistor 2N1394 phototransistor. If desired, other photosensitive elements such as a photocell can be utilized.

The lamp 64 is mounted in a cylindrical member 68 which is threaded into the upper section 37. A cap 69 is threaded into the cylindrical member 68 and serves to hold the lamp socket 71 mounted within the cylindrical member in place. The leads 72 for the lamp extend outwardly through the cap 69 through a potting compound 73. The photosensitive element 66 is mounted in a similar manner. As shown, it is mounted within the cylindrical member 74 threaded into the lower section 36. A cap 76 is threaded into the cylindrical member 74 and serves to hold the case for the photosensitive element 66 in place. The leads 77 for the photosensitive element extend out through the cap 76 through a plotting compound 78 in a manner similar to the leads 72. O-rings 79 are provided in the cylindrical members 68 and 74 to provide suitable seals between the cylindrical members and the upper and lower sections 36 and 37 and the caps 69 and 76 as shown.

This completes the description of the disc assembly 31 and the sensing assembly 32 for use with a magnetic drive meter. In such a meter, the nutating disc chamber 14 is isolated from the remainder of the meter and from the disc assembly 31 and the sensing assembly 32 so that water cannot enter into either of these assemblies. This is made possible because of the magnetic drive utilized. In certain types of meters such as the direct drive disc type meter shown in FIGURE 5, the nutating disc chamber is not isolated which presents different problems. For that reason, as shown in FIGURE 5, a slightly different construction for my rate of flow indicating device is required.

Figure 5:
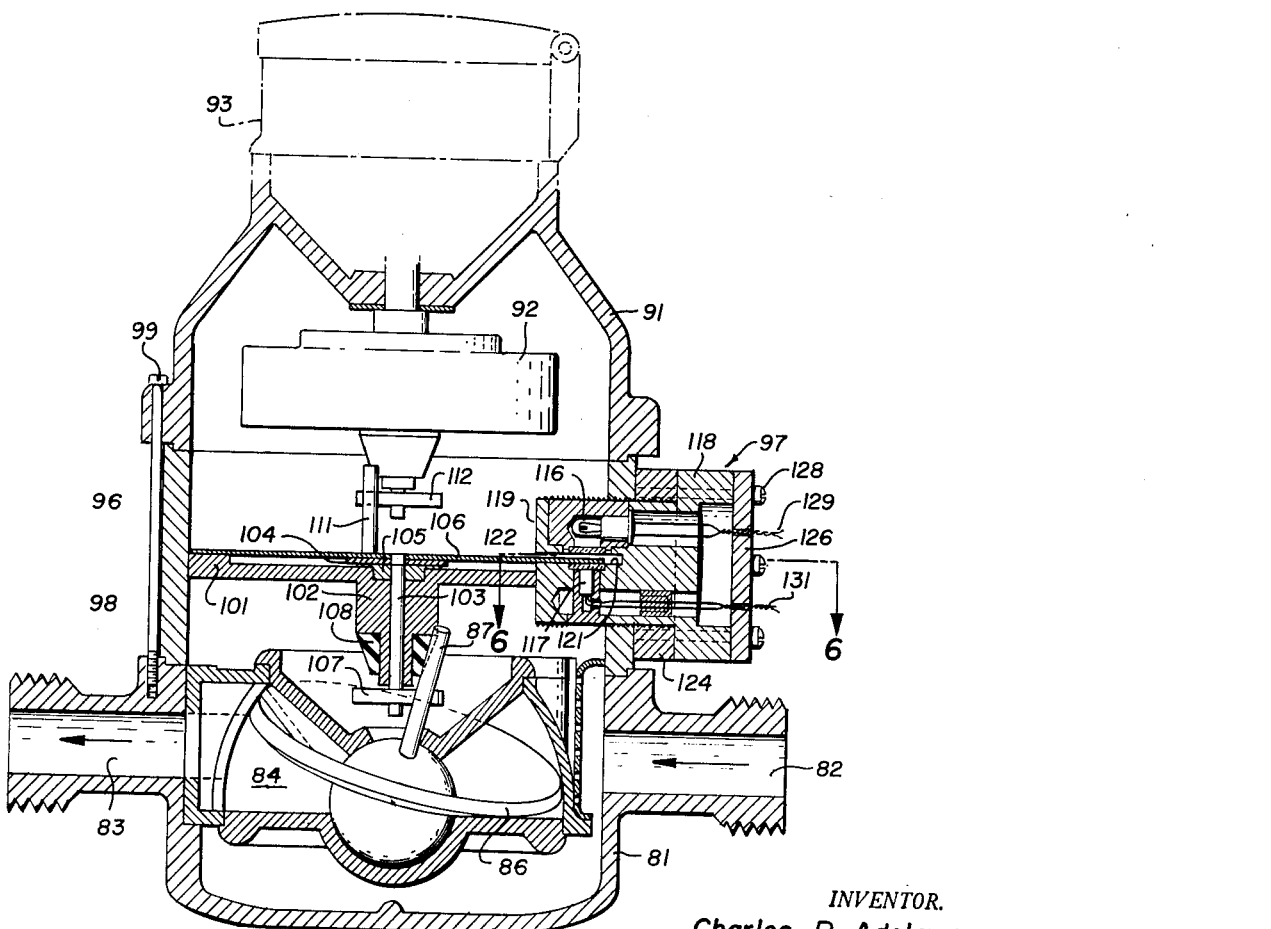
FIGURE 5 is a cross-sectional view of a direct drive disc meter incorporating my apparatus utilizing photosensitive sensing means.

As shown in FIGURE 5, the direct disc type meter can consist of a lower housing 81 which is provided with an inlet passage 82, an outlet passage 83 and a measuring chamber 84. A nutating disc 86 is mounted in the measuring chamber 84 and operates in a manner well known to those skilled in the art. The disc is provided with a pin 87 which drives a mechanism hereinafter described in detail. Such a meter also consists of an upper housing 91 in which is mounted an oil enclosed intermediate gear train 92 which drives an enclosed register 93.

Figure 6:
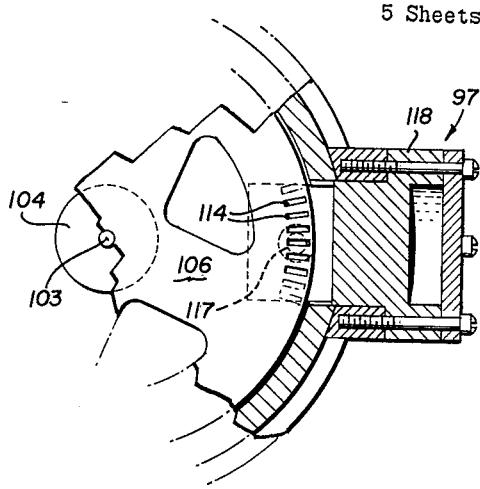
FIGURE 6 is a cross-sectional view taken along the line 6—6 of FIGURE 5.

The portion of my apparatus which is incorporated in this direct drive type of meter is shown in FIGURES 5 and 6 and consists of a disc assembly 96 which is interposed between the lower housing 81 and the upper housing 91 and a sensing assembly 97 which is mounted on the disc assembly. The disc assembly 96 consists of a cylindrical casing 98 which is adapted to mate with the upper portion of the lower housing 81 and lower portion of the upper housing 91. The cylindrical casing 98 is secured between the housings 81 and 91 by suitable means such as cap screws 99.

A divider 101 is mounted within the cylindrical casing 98 and extends across the casing at right angles to the axis of the cylindrical casing 98. The divider 101 is provided with a downwardly extending cylindrical extension 102 in which is rotatably mounted a shaft 103. A circular plate 104 is fixed to the shaft 103 and rides on a bushing 105 of suitable material such as Teflon mounted in the divider 101. A disc 106 is fixed to the circular plate 104 and is driven thereby. A pawl 107 is mounted on the lower end of the shaft 103 and is driven by the pin 87 carried by the nutating disc 86. A tapered bushing 108 is mounted on the lower extremity of the extension 102 and is adapted to be engaged by the pin 87 as the disc 86 nutates. A pin 11 is mounted on the plate 104 and is adapted to drive a pawl 112 similar to the pawl 107 to cause operation of the intermediate gear train 92.

The disc 106 is formed with a plurality of rectangular slots 114 on equal radii equally spaced around the outer margin of the disc. The disc 106, as hereinafter described, serves as a chopper in the same manner that the disc 46 serves as a chopper.

The sensing assembly consists of a lamp 116 which is mounted on one side of the disc 106 and a photosensitive device or element 117 mounted on the other side of the disc 106. The lamp 116 and the device 117 are in vertical alignment and are radially spaced so they are in alignment with the slots 114 as they pass between the lamp 116 and the device 117. The lamp 116 and the photosensitive element 117 are housed within a cylindrical member 118 which is threaded into the side wall of the casing 98. The cylindrical member 118 is provided with an insert 119 which is adapted to be removed to permit insertion and the removal of the photosensitive element 117. The cylindrical member 118 is provided with a slot 121 which accommodates the disc 106 and permits the disc to rotate between the lamp 116 and the photosensitive element 117. Because the disc 106 is operating in the fluid which is being measured, means must be provided for sealing the lamp 116 and the photosensitive element 117 from the fluid passing through the meter. To accomplish this, small transparent windows 122 of glass have been provided in the cylindrical member 118 immediately below the lamp 116 and above the photosensitive element 117. These windows effectively seal the chambers containing the lamp 116 and the photosensitive element 117 from the fluid in the meter. A spacer ring 124 is provided to obtain proper alignment of the lamp and photosensitive element with respect to the slots 114 provided in the disc 106. A cover plate 126 is provided which is secured to the cylindrical member 118 by suitable means such as screws 128. Leads 129 and 131 are provided for the lamp 116 and photosensitive element 117, respectively.

If desired, the head of the photosensitive element can be provided with a slot mask, that is, with the mask having a slot only slightly larger than a slot in the disc so that there will be an abrupt on and off pulse provided by the photosensitive element as the chopper disc passes between the light source and the photosensitive element. In this manner, a sharp cut-off is obtained.

Figure 8:
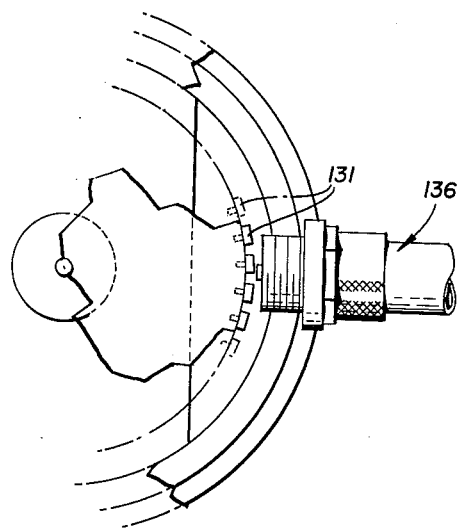
FIGURE 8 is a cross-sectional view taken along the line 8—8 of FIGURE 7.
Figure 7:
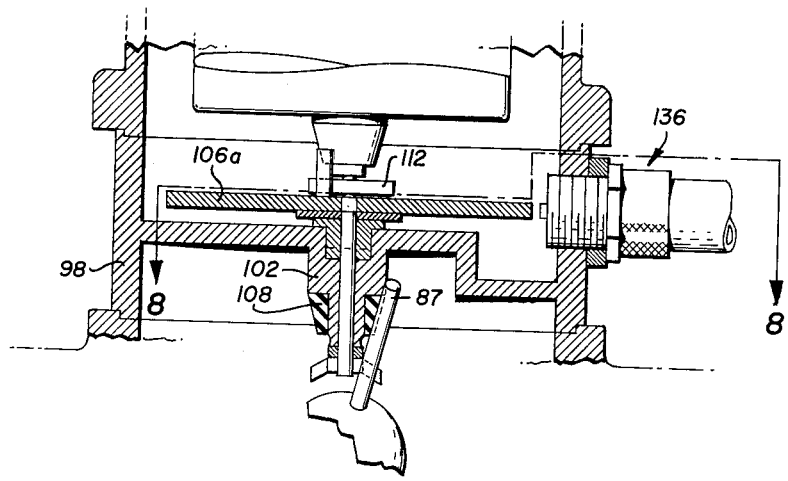
FIGURE 7 is a cross-sectional view of a direct drive meter incorporating my apparatus utilizing magnetic sensing means.

From the foregoing, it can be seen that with minor modifications, my rate of flow indicating apparatus can be incorporated in various types of meters with little difficulty. In FIGURES 7 and 8, I have shown another embodiment of my rate of flow indicating apparatus utilizing magnetic sensing means rather than photosensitive sensing means hereinbefore described.

The meter shown in FIGURE 7 is substantially identical to that disclosed in FIGURES 5 and 6. For that reason, those parts that are identical will not be described in detail. The disc 106a, however, is substanitally different from the disc 106 in that it is preferably formed of a suitable nonmagnetic material such as plastic. Instead of the slots, the disc 106a is provided with a plurality of magnetic elements 131 which are mounted on the outer periphery of the disc, as shown particularly in FIGURE 8. The magnetic elements 131 are preferably formed of a suitable magnetic material such as stainless steel. It is preferable that they be formed of a suitable noncorrosive material in view of the fact that the disc will be operating in the fluid being measured by the meter.

The magnetic elements 131 can be formed in any suitable manner such as the T-shape shown. The magnetic elements can be spaced in any manner desired. For example, in one embodiment of my invention, on a plastic disc 3⅞ inches in diameter, 60 magnetic elements 131 were utilized and spaced 6 degrees apart. The magnetic elements had a length along the periphery of the disc of approximately ⅛ inch.

The sensing means 136 utilized consists of a suitable magnetic head such as Model No. 3030AN magnetic head manufactured by Electro-Products Co. As is well known to those skilled in the art, such a sensing device consists generally of a magnetized pole piece at one end of which is provided a winding. The principle of operation is that when the magnetic elements or inserts carried by the disc pass the magnetic head 136, they change the magnetic field surrounding the winding to cause a change in the flux density and a voltage to be generated in proportion to the flux density which is transmitted to the amplifiers as hereinafter described.

The utilization of the apparatus shown in FIGURES 3 through 8 may now be described in conjunction with the block diagrams which are shown in FIGURES 1 and 2. As is apparent from the drawing in FIGURE 1, photo-sensitive sensing means is utilized, whereas in FIGURE 2, magnetic sensing means is utilized.

In FIGURE 1, rotation of the chopper disc 46 permits light from the light source 64 to periodically shine on the photosensitive device 66 to provide an output pulse which is amplified in the amplifier 141. This amplified pulse is supplied to a trigger circuit 142 which triggers a one-shot multivibrator 143. The one-shot multivibrator, as is well known to those skilled in the art, serves as a pulse shaping device to provide a pulse of the desired shape. A one-shot multivibrator is also used so that only one pulse will be generated each time light shines on the photosensitive device 66. For example, if the chopper disc 46 should stop at a point in which there is continuous exposure of the photosensitive device 66 to the light source, only one pulse will be produced by the one-shot multivibrator 143. Thus, the multivibrator 143, in addition to shaping the pulse, ensures that only one pulse will be generated for each time the light from the light source 64 shines on the photosensitive device 66.

The output of the multivibrator 143 is supplied to an integrator amplifier 144 which integrates the pulses received and provides a usable direct current signal. The output of the integrator is then supplied to a meter 147 or a suitable control 148. For example, the control 148 could be the valve on a pipeline supplying water to the positive displacement meter driving the chopper disc 46. The meter 147 can be of any suitable type such as a Rustik Graphic Recorder which is a milliammeter strip chart recorder.

As hereinafter explained, the integrating amplifier 194 can include circuitry which gives an inverse log response so that the lower rates of flow through the positive displacement meter which drives the chopper disc 46 actually take up a greater portion of the meter scale than do the higher rates of flow. This is normally desirable because of the difficulty of normally reading the low rates of flow with a strictly linear movement. However, if desired, the integrating amplifier 144 can be designed in such a manner so that the output is strictly linear or with any desired characteristic.

As can be seen from FIGURE 2, the circuitry required for use with the magnetic means is simpler than that required for the photosensitive means. As pointed out previously, as the disc 106a is rotated by the positive displacement meter, the field in the vicinity of the magnetic head 136 is disturbed to cause the magnetic head to create a voltage which is amplified in the amplifier 151 and then supplied to a rectifier 152 which converts the A.-C. into a usable D.-C. The D.-C. is supplied to a meter 133 which also can be of a suitable type such as a milliammeter or a strip chart recorder.

The circuitry shown in FIGURE 2 is somewhat simpler than that shown in FIGURE 1 for the reason that it is not necessary to provide means to prevent a readout if the disc 106a should stop. As is well known to those skilled in the art, as soon as there is no movement of the disc in the magnetic field, no voltage is created.

There is no integration in the strict sense of the word because the desired response is obtained through clipping which occurs because of the characteristics of the transistors employed.

Figure 9A:
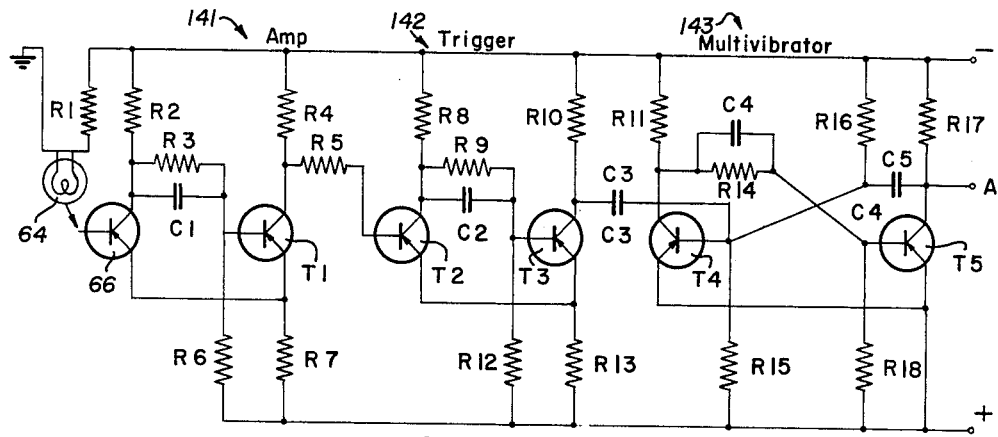
FIGURES 9a and 9b show a detailed circuit diagram of the circuitry utilized in the apparatus shown in FIGURE 1.
Figure 9B:
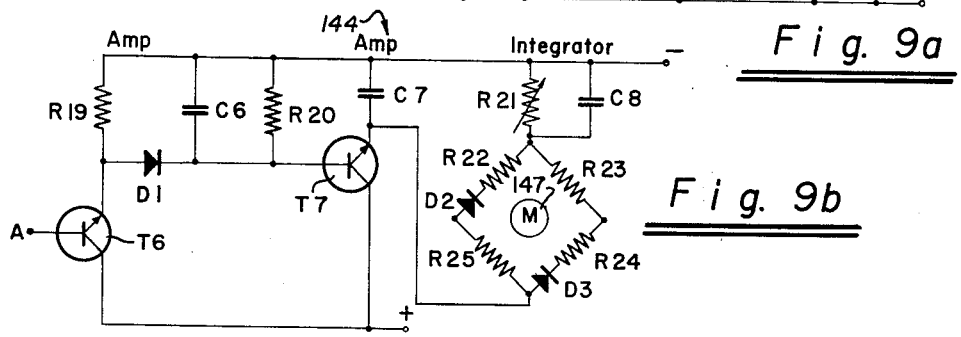

By way of example, a detailed circuit diagram of one embodiment of my invention of the type shown in FIGURE 1 is shown in FIGURES 9A and 9B. The output from the phototransistor 66 is supplied to an amplifier which includes the transistor T1. The output of the amplifier T1 is supplied to a Schmidt trigger circuit which includes the transistors T2 and T3. The Schmidt trigger circuit supplies a square pulse which drives the one-shot multivibrator which includes the two transistors T4 and T5. The output of this multivibrator produces a square pulse on the terminal A which is applied to a stage of amplification which includes a transistor T6. The output from the transistor T6 is then rectified by the diode D1. The output from the diode D1 is further amplified in the amplifier which includes the transistor T7. The output of the transistor T7 is then supplied to a bridge circuit which includes the resistors R22, R23, R24, R25 and the diodes D2 and D3. The output of the bridge is connected across the meter 147.

Since all of the circuits utilized, the amplifier 141, the trigger 142, the multivibrator 143 and the integrator amplifier 144, with the exception of an inverse log network hereinafter described are substantially conventional, the detailed operation of the various portions of these portions of the circuitry will not be discussed.

The inverse log network consists merely of the capacitor C8 and the register R21 in parallel. Pulses reach this network at rates varying directly with the amount of flow. Each pulse tends to charge the capacitor C8 which is subsequently discharged by the parallel register R21. As the frequency of pulses increases, the capacitor C8 tends to reach its maximum charge, and is recharged at such a rate that it will not lose much of its charge between pulses. This will occur at a rate proportional to an inverse log curve.

By way of example, one embodiment of my invention utilizing the circuitry as shown in FIGURES 9A and 9B have the following components and component values:

| | |
|---|---|
| Lamp 64 | G.E. type 1775. |
| Phototransistor 66 | Type No. 2N1394. |
| Transistor T1 | Type No. 2N265. |
| Transistors T2 and T3 | Type No. 2N315. |
| Transistors T4 and T5 | Type No. 2N395. |
| Transistor T6 | Type No. 2N35. |
| Transistor T7 | Type No. 2N213A. |
| Diodes D2 and D3 | Type No. 1N34. |
| Resistors: | |
| R1 | 10K ohms. |
| R2 | 10K ohms. |
| R3 | 20K ohms. |
| R4 | 18K ohms. |
| R5 | 2.7K ohms. |
| R6 | 10K ohms. |
| R7 | 20K ohms. |
| R8 | 3.3K ohms. |
| R9 | 4.7K ohms. |
| R10 | 3.3K ohms. |
| R11 | 4.3K ohms. |
| R12 | 15K ohms. |
| R13 | 1.3K ohms. |
| R14 | 10K ohms. |
| R15 | 20K ohms. |
| R16 | 20K ohms. |
| R17 | 4.3K ohms. |
| R18 | 10K ohms. |
| R19 | 2.4K ohms. |
| R20 | 330 ohms. |
| R21 | 10K ohms. |
| R22, 23, 24, 25 | 100 ohms. |
| C1 | 300 micro-microfarads. |
| C2 | 300 micro-microfarads. |
| C3 | 200 micro-microfarads. |
| C4 | 200 micro-microfarads. |
| C5 | .02 microfarad. |
| C6 | 330 micro-microfarads. |
| C7 | 100 micro-microfarads. |
| C8 | 50 micro-microfarads. |
| Negative voltage supply | −3 volts. |
| Positive voltage supply | +3 volts. |

It was found that this circuit operated very satisfactorily. A Rustik Strip Chart Recorder was used for obtaining demand type information.

Figure 10:
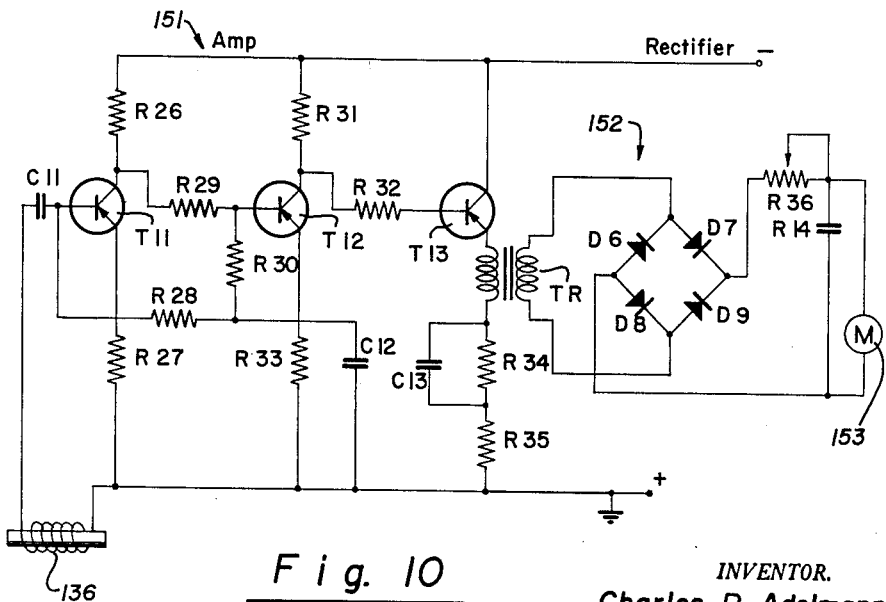
FIGURE 10 is a detailed circuit diagram of the circuitry utilized in the apparatus shown in FIGURE 2.

A circuit diagram of my type of apparatus incorporating the invention in FIGURE 2 is shown in FIGURE 10. The voltage from the magnetic head 136 drives a three-stage transistor amplifier by capacitive coupling through a capacitor C11. The amplifier includes the two transistors T11 and T12 and is provided with a feedback circuit through resistors R28 and R30 to the input of the second stage to thereby provide greater linearity in the amplifier. The output of the second stage of the amplifier is supplied to a third stage utilizing a transistor T13. The amplifier is of a conventional type and is designed to operate in audio frequency range.

A one to one transformer is connected in the emitter circuit of the transistor T13 and has its output connected across a full wave bridge consisting of diodes D6, D7, D8 and D9. This bridge converts the A.-C. to D.-C. The D.-C. is filtered by the capacitor C14 and then is applied directly to the meter 153. The potentiometer R36 is provided for calibration purposes. The meter 153, as hereinbefore explained, can either be an indicator or a recorder.

By way of example, one embodiment of my invention utilizing the circuitry shown in FIGURE 10 had the following components and the following component values:

| | |
|---|---|
| T11 and T12 | Type 2N265. |
| T13 | Type 2N241. |
| Diodes D6, D7, D8 and D9 | Type 1N34A. |
| Resistor R26 | 15K ohms. |
| Resistor R27 | 47 ohms. |
| Resistor R29 | 1K ohm. |
| Resistor R30 | 330K ohms. |
| Resistor R31 | 12K ohms. |
| Resistor R32 | 1K ohm. |
| Resistor R33 | 1500 ohms. |
| Resistor R34 | 2.5K ohms. |
| Resistor R35 | .5K ohm. |
| Resistor R36 | 5K ohms. |
| C11 | 10 micro-microfarads. |
| C12 | 50 micro-microfarads. |
| C13 | 50 micro-microfarads. |
| C14 | 500 micro-microfarads. |
| Negative voltage supply | −12 volts. |
| Positive voltage supply | +12 volts. |

This circuit was also found to operate very satisfactorily. Its primary advantage over the circuitry shown in FIGURE 10 is that it is much simpler.

It is apparent from the foregoing that I have provided rate of flow indicating apparatus which is particularly adaptable for use with positive displacement liquid meters to provide rate of flow information. As hereinbefore explained, my apparatus can be utilized with mechanically actuated meters or magnetic drive meters. The meters, as hereinbefore explained, can either be of a nutating disc type, the piston type or the turbine type. The apparatus can either be provided as an adapter unit for use with conventional type meters, or it can be incorporated in the meter itself as a permanent part of the meter.

Although I have primarily discussed use of my apparatus in connection with water meters, it is readily apparent that it can be utilized with other types of positive displacement meters as, for example, meters for measuring chocolate, molasses, or any other liquid type products. It is also readily apparent that my apparatus can be utilized for open loop or closed loop control with very minor modifications.

I claim:

1. In a rate of flow indicating apparatus of the type adapted for use with a meter for measuring fluid flow of the type having a positive displacement drive mounted in a housing and a detachably mounted register secured to the housing and driven by the displacement drive, the apparatus comprising a separate detachable casing, the casing being adapted to be mounted on the housing and wherein the register is adapted to be mounted on the casing, a member rotatably mounted in said casing and adapted to be driven by the positive displacement drive in the housing, sensing means mounted on said casing for sensing the rate of rotation of the member, a control device, means for supplying a signal from said sensing means to the control device, and means driven by said member and adapted to drive said register.

2. Apparatus as in claim 1 wherein said sensing means includes a light source, and a photosensitive device adapted to receive light from said light source and wherein said rotatable member is arranged to interrupt the light from the light source to the photosensitive device, said light source, photosensitive device and said rotatable member being isolated from the fluid flow.

3. Apparatus as in claim 1 wherein said member is a disc-like member and wherein said sensing means includes a magnetic head and a plurality of regularly spaced magnetic elements mounted on the outer peripheral margin of the member, the member being arranged so that the magnetic elements disturb the magnetic field created by the magnetic head as the member is rotated.

4. In a rate of flow indicating apparatus, a housing adapted to have the fluid to be metered to flow therethrough, a positive displacement drive mounted in the housing, a casing detachably and removably mounted on the housing, a member rotatably mounted in the casing, means connected to said member and to said positive displacement drive so that as the drive is operated, said member is rotated, sensing means mounted on the casing for sensing the rate of rotation of the member, a control device, means for supplying a signal from the sensing means to the control device in accordance with the rate of rotation of the member, a register detachably and removably mounted on said casing, and means connected to said register and to said member so that as said member is rotated, said register is operated, said housing, said casing and said register being in substantial vertical alignment said register being adapted to be mounted directly on said housing when said casing is removed so that said register is driven by said positive displacement drive.

5. Apparatus as in claim 4 wherein said member is a disc-like member which is provided with a plurality of equally spaced openings arranged in a circle thereon and wherein the sensing means compreses, a light source mounted on one side of the openings in the disc-like member, a photo-sensitive device mounted on the other side of the disc-like member and positioned to receive light from the light source through the holes in the disc-like member, the space between the light source and the photosensitive element being free of the fluid passing through the housing.

6. Apparatus as in claim 4 wherein said sensing means includes a magnetic head and a plurality of regularly spaced magnetic elements mounted on the peripheral margin of said member, the magnetic head being positioned so that the magnetic elements disturb the magnetic field created by the magnetic head as the said member is rotated.

7. In a rate of flow indicating apparatus, a housing adapted to have the fluid to be metered to flow therethrough, a positive displacement drive mounted in the housing and operated as the fluid flows through the housing, said positive displacement drive including a nutating shaft, a casing removably mounted on said housing, a disc-like member, means for mounting the disc-like member in the casing, means forming a drive connection between the disc-like member and the rotating shaft so that as the nutating shaft moves, the disc-like member is driven, sensing means mounted on the casing for sensing the rate of rotation of said disc-like member, a control device, means for supplying a signal from the sensing means to the control device in accordance with the rate of rotation of said disc-like member, a register removably mounted on said casing, said register having a driven shaft, and means forming a connection between the disc-like member and said driven shaft of the register so that as said disc-like member is rotated, said driven shaft is rotated to operate said register, said register being adapted to be removably mounted directly on said housing when said casing is removed so that the nutating shaft drives the driven shaft of the register directly.

References Cited in the file of this patent

UNITED STATES PATENTS

| | | |
|---|---|---|
| 2,316,198 | Van Der Berg | Apr. 13, 1943 |
| 2,623,389 | Oosterom | Dec. 30, 1952 |
| 2,702,897 | Dewey | Feb. 22, 1955 |
| 2,812,661 | Cox | Nov. 12, 1957 |
| 2,849,014 | Pressler et al. | Aug. 26, 1958 |
| 2,983,907 | Scourtes | May 9, 1961 |
| 2,988,916 | Waugh | June 20, 1961 |
| 2,991,652 | Bassett | July 11, 1961 |
| 3,039,311 | Bassett | June 19, 1962 |